United States Patent
Beatty et al.

(10) Patent No.: US 9,501,368 B2
(45) Date of Patent: *Nov. 22, 2016

(54) BACKING UP AND RESTORING SELECTED VERSIONED OBJECTS FROM A MONOLITHIC DATABASE BACKUP

(75) Inventors: Louis Beatty, Ormond Beach, FL (US); Steven R. DeVos, Kirkland, WA (US); Deepak Saraf, Windermere, FL (US)

(73) Assignee: Veritas Technologies LLC, Mountain View, CA (US)

( * ) Notice: Subject to any disclaimer, the term of this patent is extended or adjusted under 35 U.S.C. 154(b) by 721 days.

This patent is subject to a terminal disclaimer.

(21) Appl. No.: 12/242,079

(22) Filed: Sep. 30, 2008

(65) Prior Publication Data

US 2010/0082553 A1  Apr. 1, 2010

(51) Int. Cl.
*G06F 11/14* (2006.01)

(52) U.S. Cl.
CPC ....... *G06F 11/1469* (2013.01); *G06F 2201/80* (2013.01)

(58) Field of Classification Search
CPC .......... G06F 11/1458; G06F 11/1469; G06F 11/1448; G06F 11/1446; G06F 2201/84
See application file for complete search history.

(56) References Cited

U.S. PATENT DOCUMENTS

| 6,453,325 | B1* | 9/2002 | Cabrera .............. G06F 11/1461 |
| 6,564,215 | B1* | 5/2003 | Hsiao et al. |
| 6,711,593 | B1* | 3/2004 | Gordon ............. G06F 17/30377 707/615 |
| 7,200,621 | B2 | 4/2007 | Beck et al. .................... 707/202 |
| 7,398,529 | B2 | 7/2008 | Prabakaran et al. .......... 719/316 |
| 7,418,619 | B1 | 8/2008 | Uhlmann et al. ................. 714/2 |
| 7,694,103 | B1 | 4/2010 | Kushwah ...................... 711/171 |
| 2004/0113943 | A1 | 6/2004 | Cooper et al. ................ 345/744 |
| 2004/0204949 | A1 | 10/2004 | Shaji et al. ....................... 705/1 |
| 2004/0267835 | A1* | 12/2004 | Zwilling et al. ............. 707/202 |
| 2005/0138087 | A1* | 6/2005 | Beck .................. G06F 11/1469 |
| 2005/0216788 | A1 | 9/2005 | Mani-Meitav et al. .......... 714/6 |

(Continued)

FOREIGN PATENT DOCUMENTS

| EP | 1 693757 | 8/2006 |
| WO | WO 01/06366 | 1/2001 |

(Continued)

OTHER PUBLICATIONS

Beatty, Louis J. and Steven R. DeVos; U.S. Appl. No. 11/960,309, filed Dec. 19, 2007; entitled "Techniques for Recovery of Application Level Objects."

(Continued)

*Primary Examiner* — Jensen Hu
(74) *Attorney, Agent, or Firm* — Campbell Stephenson LLP

(57) ABSTRACT

A method, system and computer-readable storage medium that selectively restore a version of an application object stored in a monolithic backup of a database, while maintaining hierarchical and other metadata relationships of the restored portion of the database are disclosed. Such a mechanism receives a request to restore a version of a selected object from among a plurality of backed up objects in a database backup, locates information associated with the selected object in the backup, and restores the version of the selected object to a target storage area using information associated with the selected object. Database table metadata, gathered from the backed up database at the time the backup was created, can be used to locate the information associated with the selected object.

20 Claims, 7 Drawing Sheets

(56) References Cited

U.S. PATENT DOCUMENTS

| | | | |
|---|---|---|---|
| 2007/0027937 A1* | 2/2007 | McGrattan et al. | 707/204 |
| 2007/0130229 A1* | 6/2007 | Anglin | G06F 17/30017 |
| 2007/0214191 A1 | 9/2007 | Chandrasekaran | |
| 2007/0282926 A1 | 12/2007 | Ben-Yehuda et al. | |
| 2008/0034039 A1* | 2/2008 | Cisler et al. | 709/204 |
| 2008/0154919 A1 | 6/2008 | Barlen et al. | |
| 2009/0249005 A1* | 10/2009 | Bender | G06F 11/1435 711/162 |

FOREIGN PATENT DOCUMENTS

| | | |
|---|---|---|
| WO | WO 2004/086226 | 10/2004 |
| WO | WO 2005/066839 | 7/2005 |
| WO | WO 2007/088084 | 8/2007 |

OTHER PUBLICATIONS

Louis Beatty et al., "Backing Up and Restoring Security Information for Selected Database Objects," U.S. Appl. No. 12/242,136, filed Sep. 30, 2008, Specification pp. 1-29 and Drawings pp. 1-8.

Louis Beatty et al., "Restoring Selected Objects From a Monolithic Database Backup," U.S. Appl. No. 12/242,014, filed Sep. 30, 2008, Specification pp. 1-23 and Drawings pp. 1-6.

Office Action Summary Translation for JP Application No. 2006-137116 (Cited Reference in JP Office Action dtd Oct. 15, 2013 for JP counterpart application No. 2011-529251).

Office Action Summary Translation for JP Application No. 2005-141555 (Cited Reference in JP Office Action dtd Dec. 14, 2013 for JP counterpart application No. 2011-529158).

Office Action Summary Translation for JP Application No. 2005-05127965 (Cited Reference in JP Office Action dtd Dec. 14, 2013 for JP counterpart application No. 2011-529158).

* cited by examiner

BACKING UP AND RESTORING SELECTED VERSIONED OBJECTS FROM A MONOLITHIC DATABASE BACKUP

FIELD OF THE INVENTION

The present invention relates to a field of computer backups and restoration, and particularly to a method and system for selectively restoring versioned objects from a monolithic database backup.

BACKGROUND OF THE INVENTION

An ever-increasing reliance on information and the computing systems that produce, process, distribute, and maintain such information in its various forms, continues to put great demands on techniques for storing, backing up, and restoring such information. As businesses adopt techniques for centralizing information resources across an enterprise to enable collaboration and document management, storage, backup and restoration of such information becomes even more critical to the functioning of the enterprise.

In a typical enterprise-level collaboration and document-management platform, data from one or more user-oriented application objects can be stored in a centralized storage object such as a database. The database maintaining the data from the variety of application objects can be configured to maintain data relationships, or hierarchies, imposed by the application objects. The database can also be configured to store multiple versions of data objects, for example, documents and list items. Any backup and restoration scheme for such a database must maintain the relationships and hierarchies of the data created by the application objects, as well as be able to manage restoration of data object versions.

Traditional methods of backing up and restoring such a database are both personnel and resource intensive. For example, given that there are a multitude of application object-based areas in the database, a backup administrator would be responsible for knowing and selecting those portions of the database that are necessary to protect. Such an up-front, granular approach to data protection requires that the backup administrator, who may not be the database administrator, know the topology of the database in order to build a protection schema for a particular application object. Further, any changes made to the hierarchical object structure for an application would need to be taken into account by the backup administrator upon occurrence of those changes. This traditional backup approach is called a granular backup scheme, because the areas in the database associated with each application object are backed up separately. Under a granular backup scheme, restoration of data related to a particular application object can be reasonably targeted because each application object has its own set of backups.

An alternate method of backup is to backup the entire database monolithically. A traditional method of restoring data from such a monolithic backup of the database is to restore the entire database snapshot to a temporary area and then select the desired information from the database to include in an active target database. Drawbacks of such a back-end method of data selection are that it takes time to restore all the data from a database backup from which the desired information would then be selected and disk resources are consumed by the temporary copy of the database.

It is therefore desirable to have a mechanism that realizes the efficiency of monolithically backing up the entire database, thereby not requiring that a backup administrator be familiar with the structure of the database being backed up. It is further desirable that a user be able to selectively restore portions of the backed up database when desired so as to speed recovery time. It is also desirable that the restoration mechanism be capable of distinguishing those backed up objects that are versioned and to restore those versions in a manner compatible with normal operation of the collaboration and document-management platform.

SUMMARY OF THE INVENTION

Embodiments of the present invention provide a mechanism to selectively restore a version of an application object stored in a monolithic backup of a database, while maintaining hierarchical and other metadata relationships of the restored portion of the database. Embodiments of the present invention provide a method, system and computer-readable storage medium that provide a mechanism for receiving a request to restore a version of a selected object from among a plurality of backed up objects in a database backup, locating information associated with the selected object in the backup, and restoring the version of the selected object to a target storage area using information associated with the selected object. Aspects of the present invention use database table metadata gathered from the backed up database at the time the backup was created in order to locate the information associated with the selected object.

A further aspect of the above embodiments of the present invention provides for copying a current version of the selected object found in the target storage area to a second object in the storage area and then restoring the requested version of the selected object as the current version of the selected object. Another aspect of the above embodiments of the present invention provides for restoring each version of the selected object to the target storage area.

Other aspects of the above embodiments of the present invention provide for determining a location and structure of a database table in the backup of the database using the database table metadata, reading the backed up database table, and if an object associated with the database table is versioned, then reading a version table associated with the database table and collecting information associated with each version of the object.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Embodiments of the present invention provide a mechanism for selectively restoring application object data from a monolithic backup of a database storing the application object data. Embodiments of the present invention provide this capability by identifying, at the time of the database backup, metadata stored in the database that describes the application object data, structures that the application object data is stored within, and interrelationships between those structures. Embodiments of the present invention can store information regarding this metadata to be used during restore operations. During a restore operation, embodiments of the present invention can access the stored information related to the metadata and use that information to directly access the metadata within the database backup. Embodiments of the present invention use the accessed metadata to provide a description of the data backed up from the database and the relationships between such data (e.g., a hierarchy of data structures and whether the data is versioned) to a user restoring data. Embodiments of the present invention can further access data selected from such a description from the database backup and restore that information to a target database. In this manner, a database comprising data from one or more application objects can be efficiently backed up in a monolithic fashion, and then be efficiently restored in a targeted fashion. Further, personnel resources are more efficiently utilized in that a backup administrator need not be familiar with the structure of a database being backed up, leaving structural familiarity to a person restoring a specific set of data.

Figure 1:
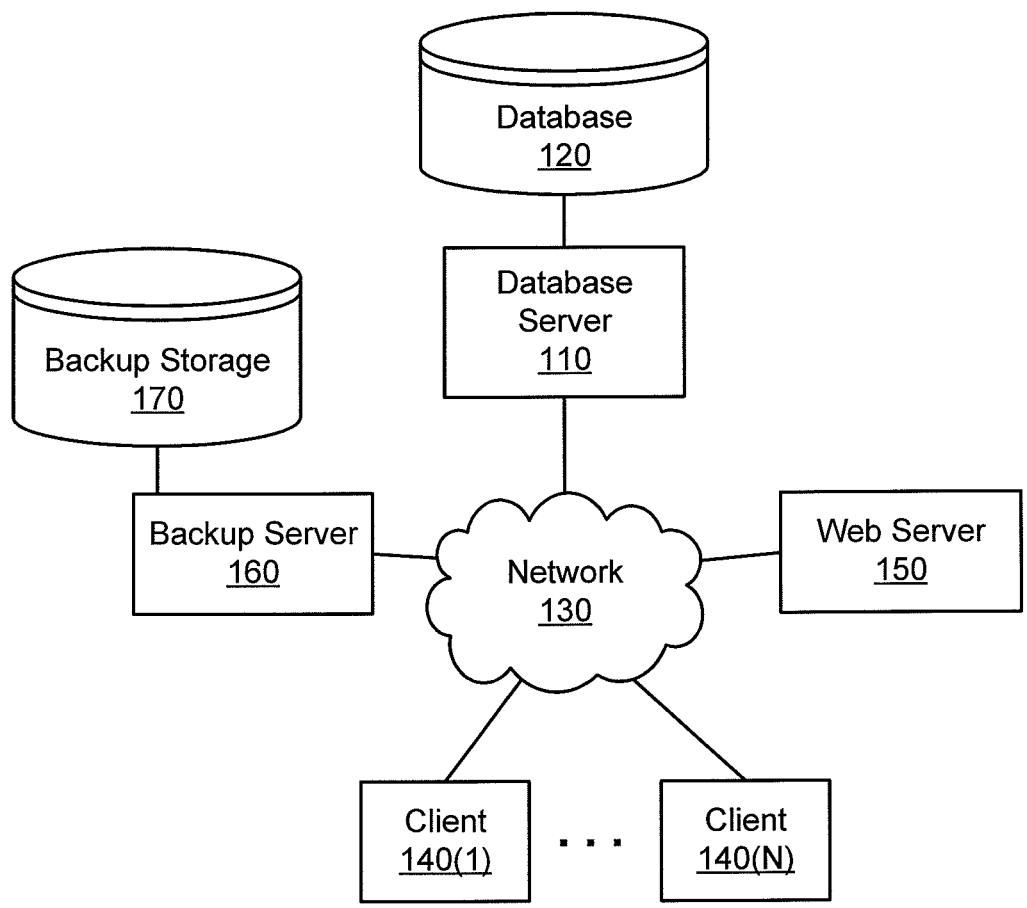
FIG. 1 is a simplified block diagram illustrating an example of a network configurable to employ embodiments of the present invention.

FIG. 1 is a simplified block diagram illustrating an example of a network configurable to employ embodiments of the present invention. A database server 110 is coupled, directly or indirectly, to storage volumes storing a database 120. Database 120 can be accessed by one or more application objects that store data in database 120. Database server 110 is coupled to a network 130 that provides access to and from the database server. Network 130 is typically an enterprise-level network for an organization, and can include, without limitation, local area networks, metro area networks, wide area networks, and the like. Network 130 can be supported by standard networking hardware and protocols, including, for example, ethernet routers, optical cabling, and the like. Network 130 can also couple computer equipment in one or more locations of an enterprise (e.g., clients 140(1)-(N)), thereby providing communication from those clients to database server 110.

The network illustrated in FIG. 1 is also coupled to web server 150. Web server 150 can provide user access to an application associated with one or more application objects. Network 130 can have one or more web servers 150 each providing a separate application or multiple web servers distributing the same application. Web server 150 provides an application object model to access data stored in database 120 by communicating with database server 110. Such communication between web server 150 and database server 110 can be via an application program interface (API) shared by the application objects served by web server 150 and database server 110.

A backup server 160 is coupled to network 130 and is configured to store backup images of data stored on network 130 in one or more backup storage volumes 170. Backup server 160 can be configured to run a variety of types of backup utilities that provide snapshots of data on the network at the time the backup is performed. Backup server 160 can, for example, backup a database 120 by directly accessing the data via database server 110. In this manner, a full monolithic backup of database 120 can be performed via the database server's SQL interface without regard to the specific data structures stored within the database. Alternatively, if a specific portion of database 120 is desired to be backed up, backup server 160 can access a particular application object's data via the associated application's web server 150. In this manner, a granular backup of a particular application object stored in database 120 can be performed.

A downside to performing a granular backup, as described above, is that the resources of web server 150 associated with the particular application are consumed. This consumption of web server resources can slow or halt access to the served application during the time of backup. By directly backing up the database via database server 110, consumption of web server resources is avoided. But, in a traditional backup scheme, restoration of specific application object data can then only be performed by restoring the entire database and then selecting data from that restored database. Such a restore and selection operation consumes both time and physical resources (e.g., disk space required to store the fully restored backup).

Figure 2:
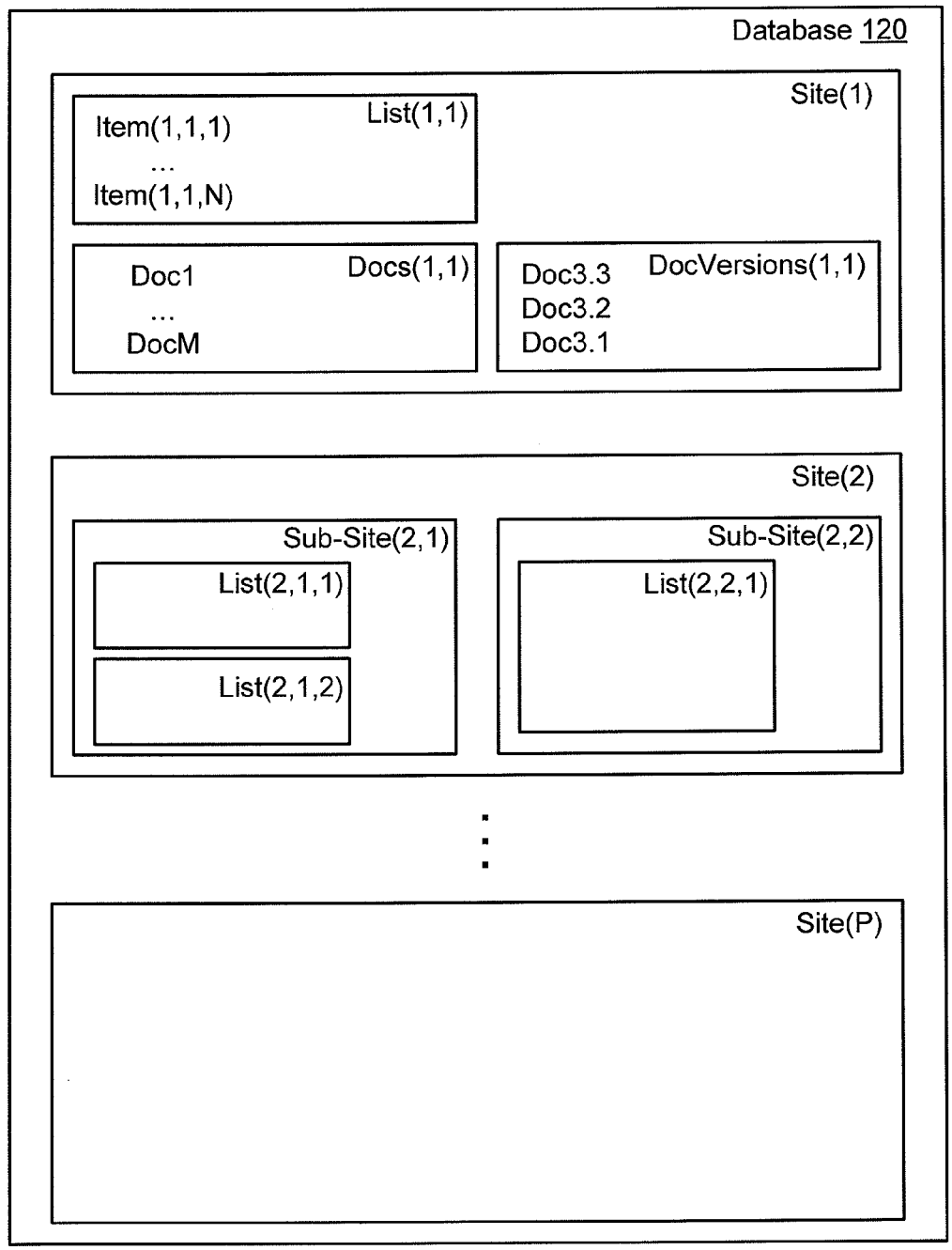
FIG. 2 is a simplified block diagram illustrating an example of an object layout within a database that is usable in conjunction with embodiments of the present invention.

FIG. 2 is a simplified block diagram illustrating an example of an object layout within a database 120 that is usable in conjunction with embodiments of the present invention. Database 120 contains one or more containers labeled Site(1)-(P). Each Site can be associated with a specific application. Each Site is therefore an application object having a unique set of characteristics defined by the Site's association with a particular application. A Site can have, for example, an associated URL, a unique identifier, an owner identifier, associated security information, associated disk quotas and disk usage information, and the like. One or more Sites can be associated with a particular application, depending on the nature of the application.

Sites can be associated with other containers. For example, Site(2) includes two Sub-Site containers: Sub-Site (2,1) and Sub-Site(2,2). Each Sub-Site can include associated information describing the Sub-Site, as described above for a Site. While each Sub-Site is associated with the parent Site, the Sub-Sites themselves are disjoint objects.

Sites and Sub-Sites can further contain other application objects. An example of one such application object is a List, which is also a container. FIG. 2 illustrates Site(1) having associated List objects (e.g., List(1,1)). Sub-Site(2,1) also has associated Lists (e.g., List(2,1,1) and List(2,1,2)). On the other hand, Sub-Site(2,2) has a single List (e.g., List(2,2,1)). List objects can also have associated information that can include, for example, an identifier of the site to which the List belongs, a name of the List, creation date and time information, security information, a type of the List (e.g., the type of information stored within the List), and the like. In addition to such characteristics directly associated with a List, a List can also inherit characteristics associated with a Site and/or a Sub-Site containing the List. Thus, for example, a List can acquire security protections associated with a Site with which the List is associated.

As illustrated in FIG. 2, a List (e.g., List(1,1)) can contain associated items or data objects (e.g., Item(1,1,1)-Item (1,1, N)). Each List can be associated with a specific type of item.

Item objects can have associated characteristics such as an identifier associating the item with a particular List and/or Site, an identifier of a user who entered or modified the item, the type of data associated with the item, and a value of the item object. Again, an item can also inherit characteristics of a List to which the item belongs and/or a Site or Sub-Site with which the item is associated.

A similar container to a List is a Docs object (e.g., Docs(1,1)). Docs containers contain document objects (e.g., Doc1-DocM), which can be files of any type. In addition, a document can be versioned; that is, multiple versions of the document can be maintained by the database. Versions of a document (e.g., Doc3.1, Doc3.2, . . . Doc3.3), other than a current version of the document, can be maintained in a DocVersions object, for example (e.g., DocVersions(1,1)). Similarly, List items can be versioned (e.g., each time an item changes, the previous version of the item is maintained in a corresponding version table).

A database 120 can not only store the containers and their associated data, but also metadata descriptions of the containers and their associated data, including their interrelationships. A database 120 can store such metadata in tables associated with Lists, items, Sites, and Sub-Sites, and the like. Indeed, a separate metadata table can be provided for each type of application object stored within database 120.

An example of a system using a database as described, is Microsoft®'s SharePoint® application. While embodiments of the present invention are not limited to use in conjunction with SharePoint® databases, embodiments of the present invention can be used with SharePoint® databases and examples will be provided below using SharePoint® terminology. It should be understood that the use of such terminology is not meant to be limiting, and embodiments of the present inventions can be used with a variety of applications that store data in objects in a database environment.

It should be further noted that the relationship between Sites, Sub-Sites, Lists and items is a hierarchical relationship. As discussed above, child objects within an application object hierarchy can inherent characteristics of parent objects. Further, using the container analogy discussed above, a child container object such as a List is contained within a parent Sub-Site or Site. Thus, in order to restore the child object to a target database, any parent objects that are not already restored must first be restored in order for the child object to be properly and completely restored within the target database. This allows the child to both be properly placed in the hierarchy and to inherit characteristics from the child's parent objects.

Figure 3:
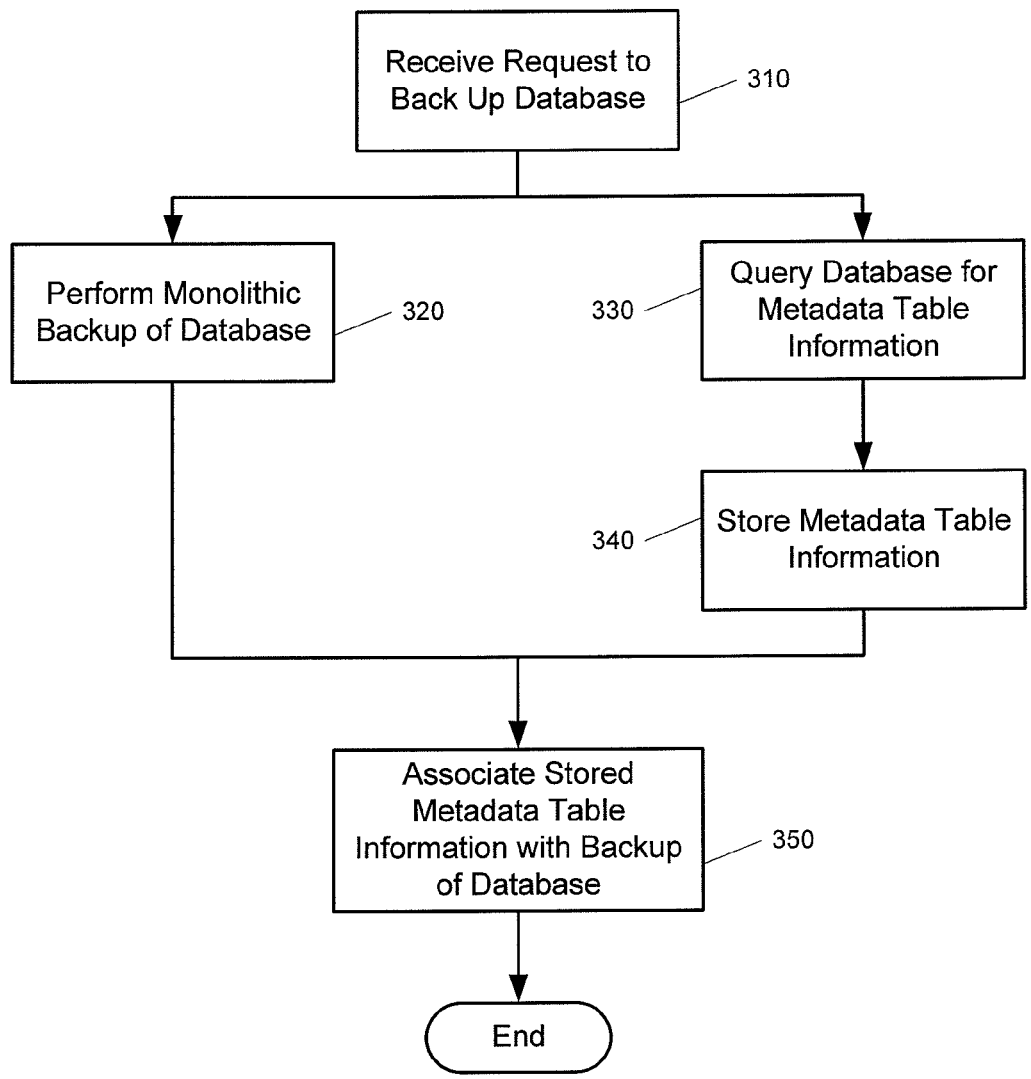
FIG. 3 is a simplified flow diagram illustrating a backup process in accord with embodiments of the present invention.

FIG. 3 is a simplified flow diagram illustrating a backup process in accord with embodiments of the present invention. A backup server 160 can receive a request to backup a database 120 (310). At this point, two processes are initiated. These processes can occur concurrently or sequentially but close enough in time that structures with database 120 are the same. A monolithic backup of the database is performed (320). Such a backup can be a snapshot of database 120 including all the information related to that database at the time of backup. The monolithic backup is performed using a direct interaction between the backup server and the database server. The backup is not performed using the application object model supplied by, for example, web server 150.

Additionally, database 120 can be queried for metadata table information (330). Metadata table information includes information about the tables containing the characteristics of the various object structures within database 120. Table information that is sought can include, for example, an index of the table, an offset of the table within the database (e.g., the location of the table), a name of the table, and a structure of the table. In this manner, information is gathered that identifies and locates each table describing an object of interest within database 120.

Embodiments of the present invention gather this metadata table information so that the tables can be accessed upon restore operations. Thus, sufficient information to allow such metadata table access is gathered, but not the information actually stored within the tables themselves. Once the metadata table information is gathered, the metadata table information can be stored (340). Such storage can take the form, for example, of a list of tables. An example of a utility that can perform such access and storage of metadata table information is described in pending U.S. patent application Ser. No. 11/960,309, entitled "Techniques for Recovery of Application Level Objects," filed Dec. 19, 2007, and having L. Beatty and S. DeVos as inventors, which is incorporated by reference herein.

Once the backup is complete and the metadata table information has been stored, the metadata table information is associated with the backup of the database (350). Such an association enables access to the stored list of metadata table information during restore operations.

Figure 4:
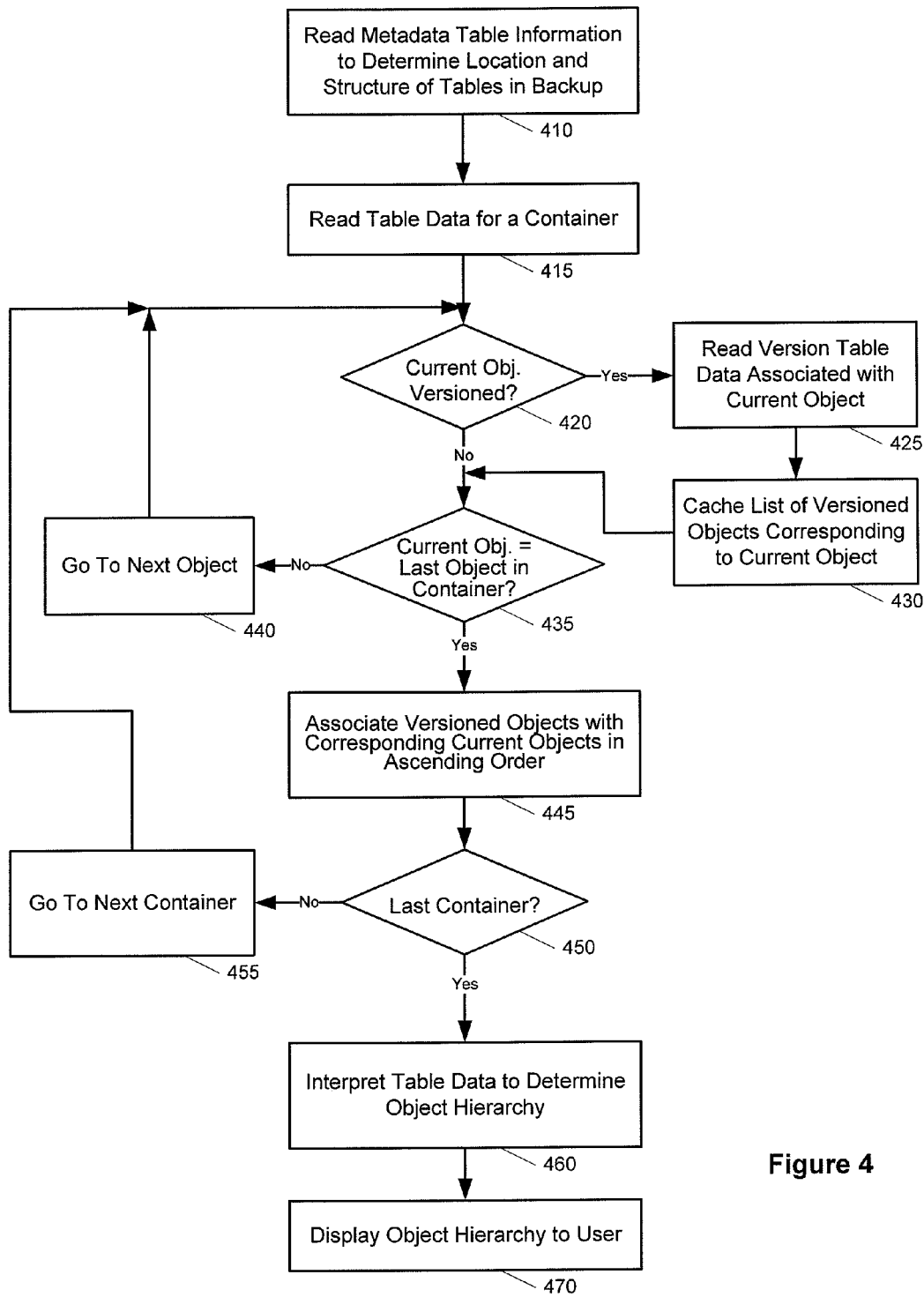
FIG. 4 is a simplified flow diagram illustrating a process for selecting objects to restore from a backed up database, in accord with embodiments of the present invention.

FIG. 4 is a simplified flow diagram illustrating a process for selecting objects to restore from a backed up database, in accord with embodiments of the present invention. In response to a user request to restore application object information from a specific backup, a restore utility can read metadata table information associated with the specified backup to determine locations and structures of tables describing application objects in the backup (410). The restore utility can then use the metadata table information to directly read the table data associated with the various containers from the backup (415). As the restore utility walks through each container and the items associated with the container, a determination is made as to whether the current object described in the table is versioned (420). That is, whether the backed up database stored more than one version of the current object at the time of the backup. In a Microsoft® SharePoint® environment, for example, List items and Docs can be versioned. If the current object is versioned, then a version table associated with the current container is located using the metadata table information and read (425). The restore utility then caches a list of versioned objects corresponding to the current object (430).

After caching the list of versioned objects for a current object or determining that the current object is not versioned, a determination can then be made as to whether the current object is the last object in the current container (435). If the current object is not the last object in the current container, then the restore utility proceeds to the next object in the current container (440) and the versioning determination process repeats. Once the examination of the objects in a container is complete, the cached version objects are associated with their corresponding current object in ascending order (445). Versioned objects are listed in the cache in ascending order so that those versioned objects can be restored in an appropriate order if selected, as will be discussed more fully below. It should be noted, that the act of ordering versioned objects in ascending order can occur either during caching (430) or during association with the current object (445).

A determination is then made as to whether the last container has been examined (450), and if not, then the restore process proceeds to the next container (455) and the process described above repeats. Once the tables related to all the containers in the backup have been read, that data can then be interpreted to determine a hierarchy of application objects within the database backup (460). The interpreted object hierarchy can then be displayed to a user (470). In the case of versioned objects, the hierarchical listing can display the current version of the object first followed by an ascending list of the associated versioned objects. The user can then review the displayed object hierarchy to determine those objects that the user wishes to restore. A user can select one or more objects at any level of hierarchy. For versioned objects, a user can select to restore all or any one of the versions of the versioned object.

Figure 5:
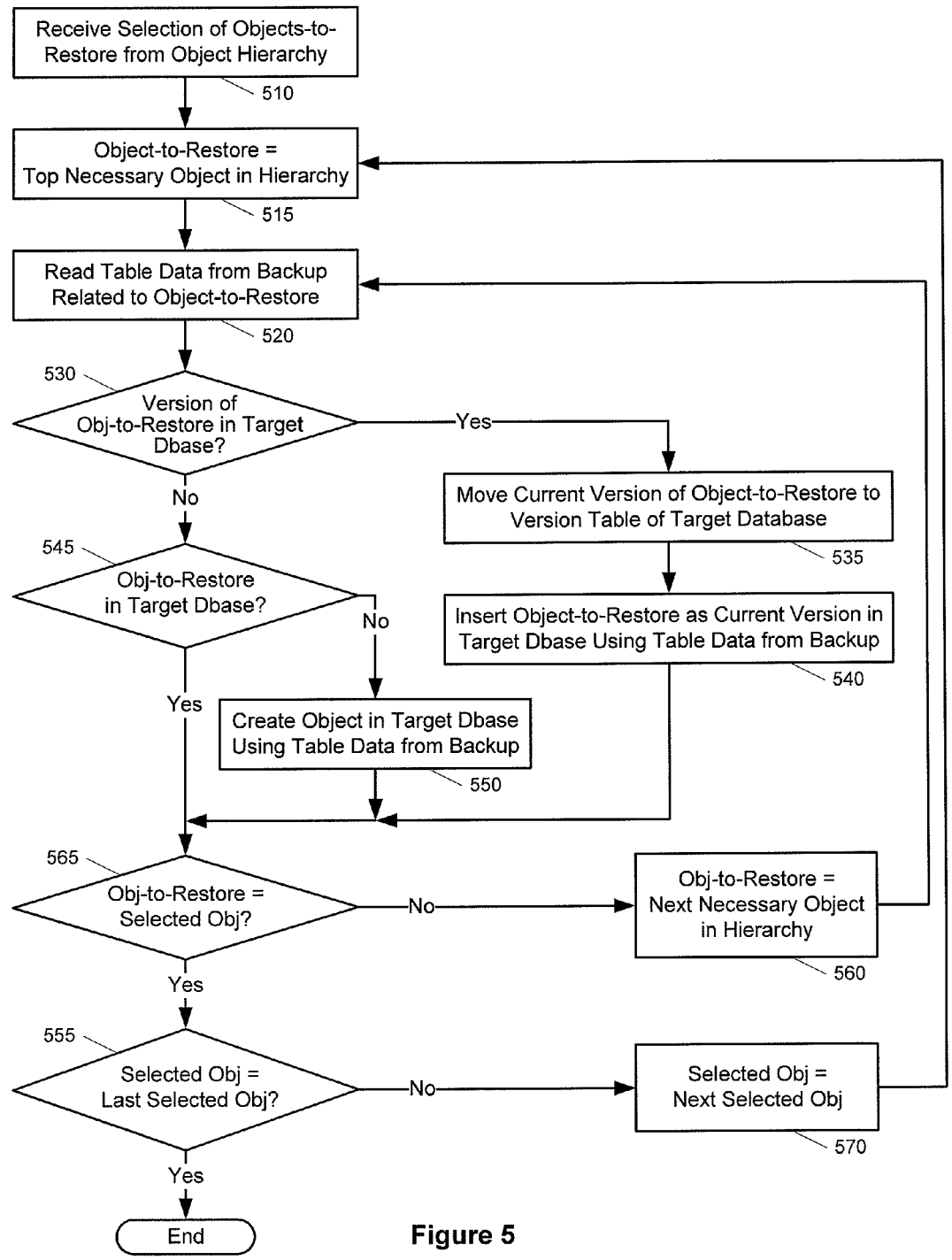
FIG. 5 is a simplified flow diagram illustrating a database restore operation of selected objects, in accord with embodiments of the present invention.

FIG. 5 is a simplified flow diagram illustrating a database restore operation of the selected objects provided by the operations of FIG. 4, in accord with embodiments of the present invention. Once the user selects the desired objects to restore, the restore utility receives the object selections (510). At this point, the restoration utility restores all the objects in the hierarchy necessary to restoring each selected object. For example, if a List object is selected, then any Site or Sub-Site objects with which the List object is associated are also subject to restore operations. As discussed above, this is because a List object, as a child of a Site object, inherits certain characteristics of the parent object. Thus, the restoration utility goes through a series of steps to restore the hierarchy.

The top object in a hierarchy necessary to restore a selected object becomes the first object-to-restore (515). The restore utility reads metadata table data from the backup related to the object-to-restore (520). Again, information necessary to locating the appropriate metadata table or tables associated with the object-to-restore is obtained from the metadata table information associated with the backup. A determination is then made as to whether a version of the object-to-restore is already present in the target database (530). If a version of the object-to-restore is already present in the target database, then the current version of the object-to-restore that is in the target database is moved to a corresponding version table in the target database (535). The object-to-restore can then be restored to the target database as the current version of the object using the table data read from the backup (540).

If a version of the object-to-restore was not previously in the target database, then a determination is made as to whether the object-to-restore itself is already present in the target database (545). If the object-to-restore is not already present in the target database, then the object-to-restore is created in the target database using the table data read from the backup (550). Restoration of the object-to-restore can be performed by supplying the object-related information to an application object model served by, for example, web server 150. By using the application object model to generate the object-to-restore in the target database, consistency of object structures with their associated application is ensured. Alternatively, if the object-to-restore is data, such as a List or Doc item, then such objects can be directly restored through, for example, SQL commands on database server 110.

Subsequent to creating the object in the target database, performing the restore operations associated with a versioned document, or determining that the object has already been restored, a determination is made as to whether the object-to-restore is the same as the object selected for restore by the user (555). If the object-to-restore is not the object selected by the user, then a next object-to-restore is selected which is a next object in the hierarchy necessary to restoring the selected object (560). Then, processing returns once again to reading the table data from the backup related to the new object-to-restore (520) and the process repeats as described above.

If the object-to-restore was the object selected by the user (555), then a determination is made as to whether the selected object was the last selected object by the user (565). That is, a determination is made as to whether each object selected by the user has now been restored. If not, then the next selected object is targeted for restore (570) and the process returns to a determination of the top object in the hierarchy necessary to restore the next selected object (515), and the process repeats as described above. If the selected object was the last object selected by the user (565), then the restoration process is complete.

By using the restoration method described above, an entire hierarchy necessary to support a selected object within a backed up database can be restored to a target database. In addition, all the characteristics of that object are restored by accessing the tables stored within the database backup that contain the characteristics necessary to describe the requested object. If an object needs to be created in the target database (e.g., step 550), the restore utility can access an application web server 150 associated with the object to create the object in the target database using the characteristics information pulled from the backup table. In this manner, the structures necessary for the application to access the object can be created automatically by the application object model and, at the same time, the necessary characteristics information describing the object are provided from the backup.

Using such a restore technique, containers can be created within the target database that have the same characteristics as the associated containers in the backed up database. A user could therefore create a structure within a target database that is the same as that in the backed up database, but which can be available for data other than that which was stored in the backed up database. That is, the backed up database serves as a template for the target database. Data can also be restored from the backed up database to the target database. Once the appropriate containers have been configured in the target database, a direct access to the database server can be made between database server and the backup server for a more rapid and efficient restoration of data to the appropriate structures in the target database, if desired.

The restore utility restores versioned objects in a manner consistent with the way such objects are treated by Share-Point®. That is, if a user selects a version of an object-to-restore, the selected version is restored as the current version of the object. If there was previously a current version of the object in the target database, then that version is moved to the version table and replaced by the restored version. Alternatively, if a user selects all versions of an object to be restored, then the restore utility can go through each version of the object-to-restore in the ascending order listed (e.g., in step 445) thereby placing each object in an appropriate location in the version "stack" in the versioning table, and retaining the backed up current version as the current version upon restore to the target database.

While FIG. 5 and its accompanying discussion provides an example of storing objects from a backed up database to a target database, it should be noted that embodiments of the present invention are not limited to restoration of objects to a database. The backed up database can include objects containing document items (e.g., a Docs table in a Share-Point® database). The hierarchical structure of the backed up database can be re-created as a directory structure in a file system, using names and identifiers provided from objects in the backed up database. Document items can then be restored directly into the directory structure, rather than into a target database.

An Example Computing and Network Environment

As shown above, the present invention can be implemented using a variety of computer systems and networks. An example of one such computing and network environment is described below with reference to FIGS. 6 and 7.

Figure 6:
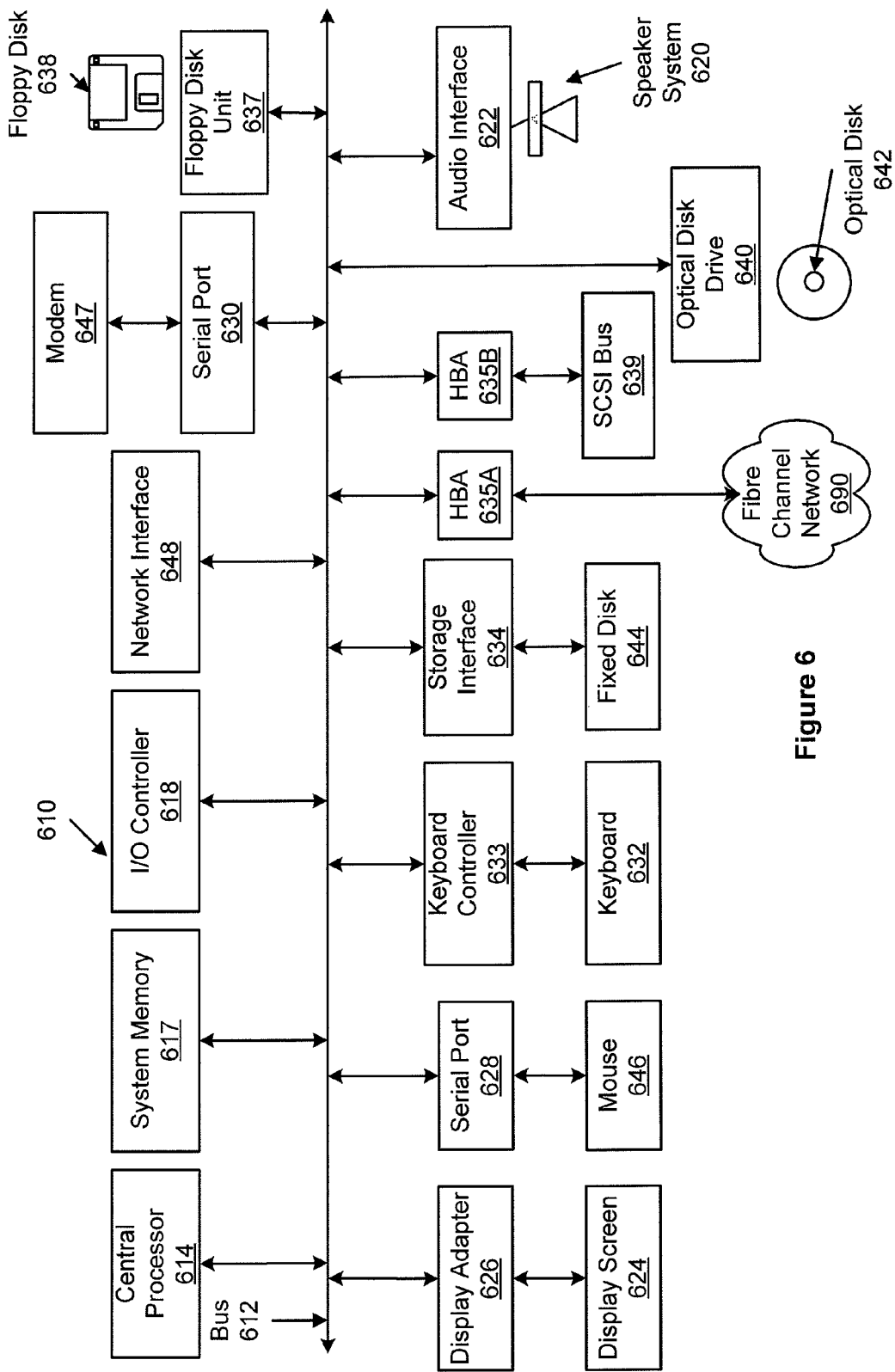
FIG. 6 depicts a block diagram of a computer system suitable for implementing embodiments of the present invention.

FIG. 6 depicts a block diagram of a computer system 610 suitable for implementing aspects of the present invention (e.g., clients 140(1)-(N), backup server 160, database server 110, and web server 150). Computer system 610 includes a bus 612 which interconnects major subsystems of computer system 610, such as a central processor 614, a system memory 617 (typically RAM, but which may also include ROM, flash RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), a storage interface 634, a floppy disk drive 637 operative to receive a floppy disk 638, a host bus adapter (HBA) interface card 635A operative to connect with a Fibre Channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 610 are generally stored on and accessed via a computer-readable medium, such as a hard disk drive (e.g., fixed disk 644), an optical drive (e.g., optical drive 640), a floppy disk unit 637, or other storage medium. Additionally, applications can be in the form of electronic signals modulated in accordance with the application and data communication technology when accessed via network modem 647 or interface 648.

Storage interface 634, as with the other storage interfaces of computer system 610, can connect to a standard computer-readable medium for storage and/or retrieval of information, such as a fixed disk 644. Fixed disk 644 may be a part of computer system 610 or may be separate and accessed through other interface systems. Modem 647 may provide a direct connection to a remote server via a telephone link or to the Internet via an internet service provider (ISP). Network interface 648 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 6 need not be present to practice the present invention. The devices and subsystems can be interconnected in different ways from that shown in FIG. 6. The operation of a computer system such as that shown in FIG. 6 is readily known in the art and is not discussed in detail in this application. Code to implement the present invention can be stored in computer-readable storage media such as one or more of system memory 617, fixed disk 644, optical disk 642, or floppy disk 638. The operating system provided on computer system 610 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 7:
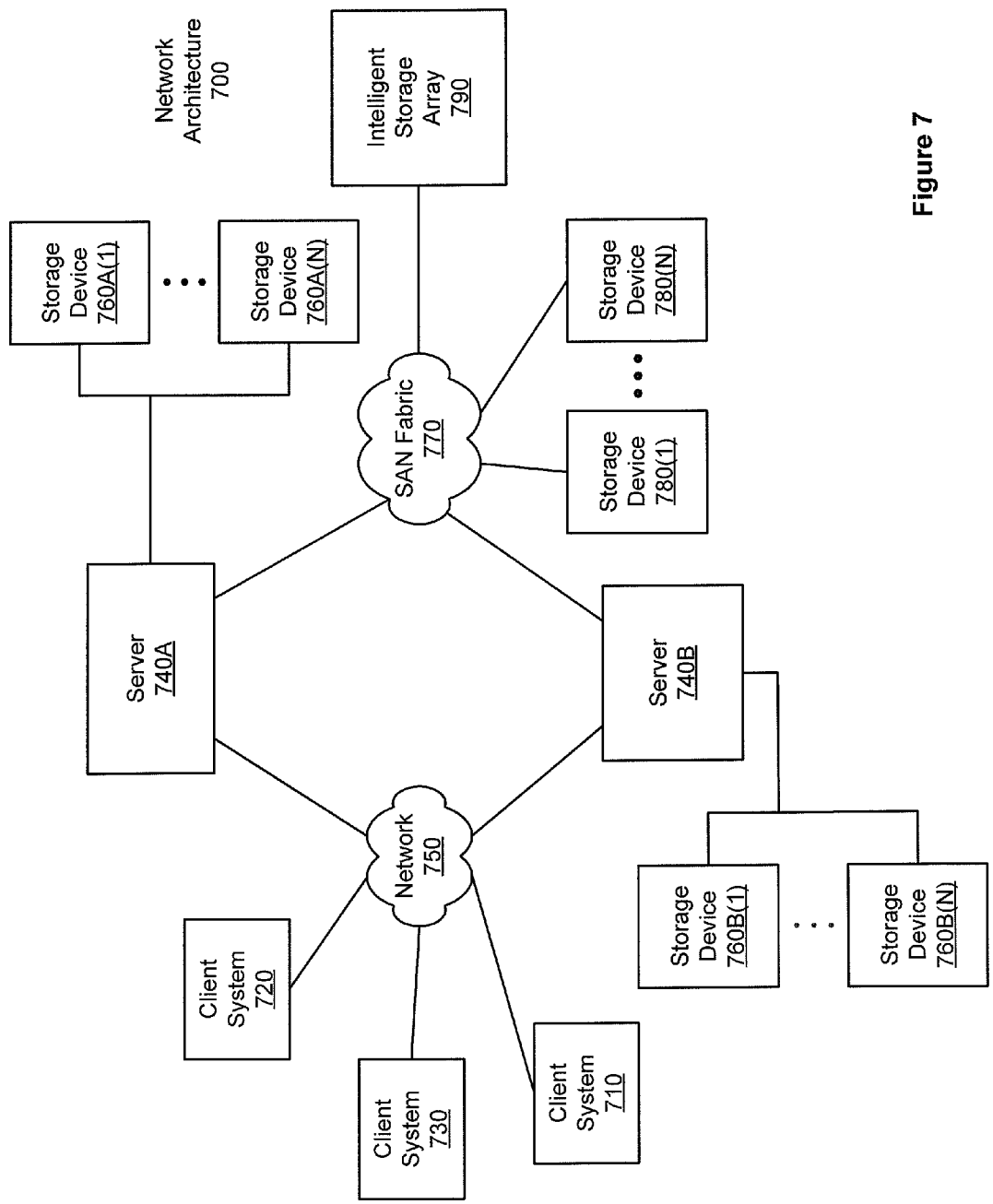
FIG. 7 is a block diagram depicting a network architecture suitable for implementing embodiments of the present invention.

FIG. 7 is a block diagram depicting a network architecture 700 in which client systems 710, 720 and 730, as well as storage servers such as, for example, servers 740A and 740B (any of which can be implemented using computer system 610), are coupled to a network 750. Server 740A is further depicted as having storage devices 760A(1)-(N) directly attached, and server 740B is depicted with storage devices 760B(1)-(N) directly attached. Storage Servers 740A and 740B are also connected to a SAN fabric 770, although connection to a storage area network is not required for operation of the invention. SAN fabric 770 supports access to storage devices 780(1)-(N) by servers 740A and 740B, and so by client systems 710, 720 and 730 via network 750. Intelligent storage array 790 is also shown as an example of a specific storage device accessible via SAN fabric 770.

With reference to computer system 610, modem 647, network interface 648 or some other method can be used to provide connectivity from each of client computer systems 710, 720 and 730 to network 750. Client systems 710, 720 and 730 are able to access information on server 740A or 740B using, for example, a web browser or other client software (not shown). Such a client allows client systems 710, 720 and 730 to access data hosted by server 740A or 740B or one of storage devices 760A(1)-(N), 760B(1)-(N), 780(1)-(N) or intelligent storage array 790. FIG. 7 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 610). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof. For example, specific electronic components can be employed in an application specific integrated circuit or similar or related circuitry for implementing the functions associated with one or more of the described functional blocks.

The present invention has been described in the context of fully functional computer systems; however, those skilled in the art will appreciate that the present invention is capable of being distributed as a computer program product in a variety of forms, and that the present invention applies equally regardless of the particular type of media used to actually carry out the distribution. Examples of such media include computer-readable storage media, as well as media and storage systems as may be developed in the future.

The above-discussed embodiments can be implemented by software modules that perform certain tasks. The software modules discussed herein may include script, batch, or other executable files. The software modules discussed herein may further include one or more sets of instructions executable by a processor configured to execute such instructions. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computer-implemented method comprising:
   receiving a request at a computer system, wherein
      the request comprises a request to restore a version of a selected object from a backup of a database,
      the backup of the database comprises a full backup of the database, in its entirety, and is created using a monolithic backup process that disregards data structures stored within the database,
      the backup of the database only comprises information sufficient for restoration of the database in its entirety,
      the backup of the database comprises a plurality of objects, and
      the plurality of objects comprises a plurality of versions of the selected object;
   locating a database table of a plurality of database tables in the backup of the database using a processor of the computer system, wherein
      the database table is associated with the selected object,
      the locating is performed using database table metadata,
      the database table metadata comprises information identifying a location of each database table of the plurality of database tables, and
      the database table metadata is gathered from the database at a time of creation of the backup;
   selecting the version of the selected object, wherein
      the selecting comprises
         determining a structure of the database table using the database table metadata,
         reading the database table, and
         if an object associated with the database table is a versioned object, reading a version table associated with the database table, and collecting information associated with each version of the object;
   generating a list comprising information about the object and the information associated with each version of the object, wherein
      the information about the each version of the object is stored in the list; and restoring the version of the selected object to a target database using the processor, wherein
the restoring comprises restoring a subset of the plurality of objects, and
the restoring is performed using the database table.

2. The computer-implemented method of claim 1, wherein the restoring the version of the selected object comprises:
detecting whether the target database comprises a current version of the selected object,
copying the current version of the selected object to a second object, wherein
the second object stores versions of objects, and
the target database comprises the current version of the selected object and the second object; and
restoring the version of the selected object to the target database as the current version of the selected object.

3. The computer-implemented method of claim 1, wherein the restoring the version of the selected object comprises:
restoring each version of the selected object, wherein
the request is a request to restore all versions of the selected object.

4. The computer-implemented method of claim 3, further comprising:
restoring a current version of the selected object to a first object; and
restoring each previous version of the selected object to a second object, wherein
the second object stores versions of objects, and
the second object is associated with the first object.

5. A system comprising:
a processor;
a first storage object coupled to the processor, wherein
the first storage object is configured to store a backup of a database,
the backup of the database comprises
a plurality of objects, and
a plurality of database tables, and
the plurality of database tables are configured to describe the plurality of objects;
a second storage object coupled to the processor, wherein
the second storage object is configured to store a target storage area, and
the target storage area is configured to store objects restored from the backup; and
a memory, coupled to the processor, and storing instructions configured to cause the processor to:
receive a request, wherein
the request comprises a request to restore a version of a selected object from the backup of the database,
the backup of the database comprises a full backup of the database, in its entirety, and is created using a monolithic backup process that disregards data structures stored within the database,
the backup of the database only comprises information sufficient for restoration of the database in its entirety, and
the plurality of objects comprises a plurality of versions of the selected object;
locate a database table of a plurality of database tables in the backup of the database, wherein
the database table is associated with the selected object,
the instructions configured to cause the processor to locate the database table using database table metadata,
the database table metadata comprises information identifying a location of each database table of the plurality of database tables, and
the database table metadata is gathered from the database at a time of creation of the backup;
select the version of the selected object, wherein
the selecting comprises
determining a structure of the database table using the database table metadata,
reading the database table, and
if an object associated with the database table is a versioned object, reading a version table associated with the database table, and collecting information associated with each version of the object;
generate a list comprising information about the object and the information associated with each version of the object, wherein
the information about the each version of the object is stored in the list; and
restore the version of the selected object to the target storage area, wherein
restoring the version of the selected object comprises restoring a subset of the plurality of objects, and
the instructions configured to cause the processor to restore the version of the selected object using the database table.

6. The system of claim 5, wherein the instructions configured to cause the processor to restore the version of the selected object further comprise instructions configured to cause the processor to:
detect whether the target storage area comprises a current version of the selected object,
copy a current version of the selected object in the target storage area to a second object stored in the target storage area, wherein
the second object stores versions of objects, and
the target storage area comprises the current version of the selected object and the second object; and
restore the version of the selected object as the current version of the selected object in the target storage area.

7. The system of claim 5, wherein the instructions configured to cause the processor to restore the version of the selected object further comprise instructions configured to cause the processor to:
restore each version of the selected object, wherein
the request is a request to restore all versions of the selected object.

8. The system of claim 7, wherein the instructions configured to cause the processor to restore the version of the selected object further comprise instructions configured to cause the processor to:
restore a current version of the selected object to a first object stored in the target storage area; and
restore each previous version of the selected object to a second object stored in the target storage area, wherein
the second object stores versions of objects, and
the second object is associated with the first object.

9. A computer program product comprising:
a plurality of instructions, comprising
a first set of instructions, configured to be executed by a processor of a computer system, and configured to receive a request at the computer system, wherein
the request comprises a request to restore a version of a selected object from a backup of a database, the backup of the database comprises a full backup of the database, in its entirety, and is created using a monolithic backup process that disregards data structures stored within the database, the backup of the database only comprises information sufficient for restoration of the database in its entirety, the backup of the database comprises a plurality of objects, and the plurality of objects comprises a plurality of versions of the selected object, a second set of instructions, configured to be executed by the processor, and configured to locate a database table of a plurality of database tables in the backup of the database, wherein the database table is associated with the selected object, the second set of instructions are configured to use database table metadata, the database table metadata comprises information identifying a location of each database table of the plurality of database tables, and the database table metadata is gathered from the database at a time of creation of the backup, a third set of instructions, configured to be executed by the processor, and configured to select the version of the selected object, wherein the selecting comprises determining a structure of the database table using the database table metadata, reading the database table, and if an object associated with the database table is a versioned object, reading a version table associated with the database table, and collecting information associated with each version of the object;

a fourth set of instructions, configured to be executed by the processor, and configured to generate a list comprising information about the object and the information associated with each version of the object, wherein the information about the each version of the object is stored in the list; and a fifth set of instructions, configured to be executed by the processor, and configured to restore the version of the selected object to a target database, wherein restoring the version of the selected object comprises restoring a subset of the plurality of objects, and the fifth set of instructions is configured to use the database table; and a computer-readable storage medium, wherein the instructions are encoded in the computer-readable storage medium.

10. The computer program product of claim 9, further comprising:
a sixth set of instructions, configured to be executed by the processor, and configured to
detect whether the target database comprises a current version of the selected object,
copy the current version of the selected object to a second object, wherein the second object stores versions of objects, and
the target database comprises the current version of the selected object and the second object; and
a seventh set of instructions, configured to be executed by the processor, and configured to restore the version of the selected object to the target database as the current version of the selected object.

11. The computer program product of claim 9, further comprising:
an eighth set of instructions, configured to be executed by the processor, and configured to restore each version of the selected object, wherein
the request is a request to restore all versions of the selected object.

12. The computer-implemented method of claim 1, wherein
the list is a container.

13. The computer-implemented method of claim 1, wherein
The object is comprised in a plurality of sites and a plurality of sub-sites.

14. The computer-implemented method of claim 1, wherein
the monolithic backup process is performed using a direct interaction between a backup server and a database server without using an application object model.

15. The system of claim 5, wherein
the list is a container.

16. The system of claim 5, wherein
The object is comprised in a plurality of sites and a plurality of sub-sites.

17. The system of claim 5, wherein
the monolithic backup process is performed using a direct interaction between a backup server and a database server without using an application object model.

18. The computer program product of claim 9, wherein
the list is a container.

19. The computer program product of claim 9, wherein
The object is comprised in a plurality of sites and a plurality of sub-sites.

20. The computer program product of claim 9, wherein
the monolithic backup process is performed using a direct interaction between a backup server and a database server without using an application object model.

* * * * *